United States Patent [19]

Sato

[11] Patent Number: 4,984,122
[45] Date of Patent: Jan. 8, 1991

[54] TAPE CASSETTE WITH AIR BLOCKING BAFFLES

[75] Inventor: Shinya Sato, Miyagi, Japan

[73] Assignee: Sony Corporation, Tokyo, Japan

[21] Appl. No.: 269,380

[22] Filed: Nov. 10, 1988

[30] Foreign Application Priority Data

Nov. 11, 1987 [JP] Japan ................................ 62-284475

[51] Int. Cl.⁵ ............................................ G11B 23/04
[52] U.S. Cl. .................................... 360/132; 360/74.6
[58] Field of Search ..................... 360/132, 74.5, 74.6; 242/197, 198, 199

[56] References Cited

U.S. PATENT DOCUMENTS

| | | | |
|---|---|---|---|
| 4,091,426 | 5/1978 | Umeda | 360/74.6 |
| 4,449,677 | 5/1984 | Ohta et al. | 360/132 |
| 4,591,936 | 5/1986 | Kikuya et al. | 242/199 |
| 4,608,616 | 8/1986 | Wakui et al. | 360/132 |
| 4,631,618 | 12/1986 | Ozawa et al. | 360/132 |
| 4,633,355 | 12/1986 | Harada | 360/132 |
| 4,646,191 | 2/1987 | Goto | 360/132 |
| 4,742,418 | 5/1988 | Taraka et al. | 360/132 |

FOREIGN PATENT DOCUMENTS

| | | |
|---|---|---|
| 0090573 | 10/1983 | European Pat. Off. . |
| 0286355 | 10/1988 | European Pat. Off. . |
| 3408694 | 9/1985 | Fed. Rep. of Germany . |
| 2545253 | 4/1984 | France . |
| 0068256 | 4/1983 | Japan ................................ 360/74.6 |
| 0233484 | 10/1986 | Japan . |
| 2061226 | 5/1981 | United Kingdom . |
| 2150916 | 7/1985 | United Kingdom . |

OTHER PUBLICATIONS

Abstract Mar. 5, 1987, vol. 11, No. 72 (P-554) (2519) Tape Cassette.

Primary Examiner—David J. Severin
Attorney, Agent, or Firm—Hill, Van Santen, Steadman & Simpson

[57] ABSTRACT

A tape cassette container having a substantially closed configuration and providing a pivoted lid allowing access, when pivoted, to a tape contained therein and having windows exposed when said lid is pivoted, wherein baffles are provided around such windows in such a relationship that when the lid is not pivoted into the open condition, the baffles provide obstruction to entry of dust or the like into the windows via spaces between portions of the lid and the exterior of the container.

6 Claims, 3 Drawing Sheets

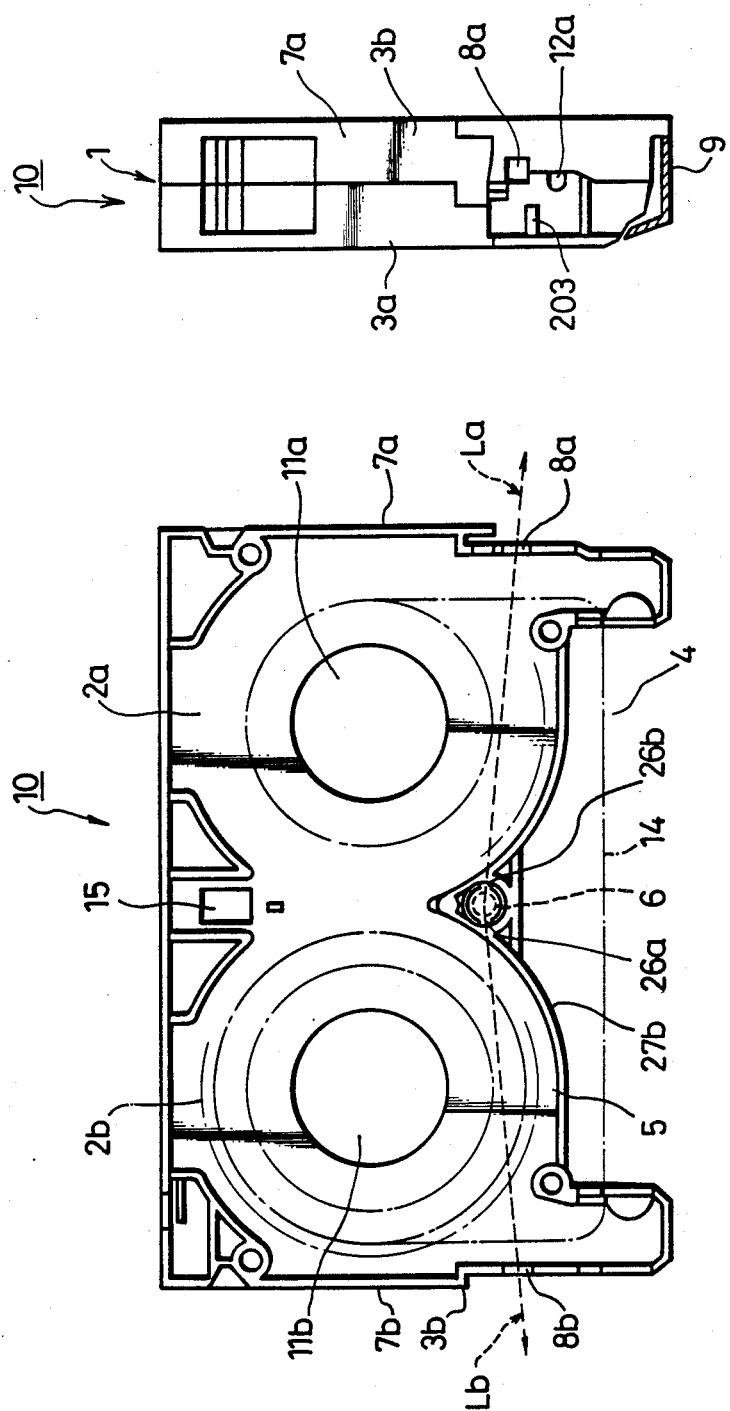

TAPE CASSETTE WITH AIR BLOCKING BAFFLES

TECHNICAL FIELD

This invention relates to a tape cassette suitable for use in recording and reproducing video and audio signals on an 8-mm video and the like.

DETAILED DESCRIPTION OF THE PRIOR ART

In a conventional reel-to reel type tape cassette, one of a piece of transparent leader tape and one end of a piece of trailer tape are respectively fixed to supply and take-up reels provided in parallel within the cassette, and a magnetic tape is connected between the leader tape and the trailer tape and wound on the supply reel or take-up reel. In operation of the tape, the ends of the magnetic tape are detected by the detection of the transmitted light or reflected from the transparent leader tape and trailer tape.

A cassette particularly for use in recording and reproducing a video signal and in which the transmitted light is used for the detection of the ends of magnetic tape is disclosed in Japanese Utility Model Laid-Open Gazette No. 40618/1980. In the tape cassette disclosed in this Gazette, a light projector insertion aperture is provided in the bottom of the take-up reel within the cassette, and a light receiving and passing window hole for allowing the passage of the light from the light emitting elements inserted in the projector insertion hole, is provided in both side walls of this cassette. When the leader tape or trailer tape overlies the light receiving window holes, the light from the light emitting element is passed to a light receiving element provided outside the cassette near the light receiving window hole. When the magnetic tape itself is opposite the light receiving window holes, the light emanating from the light emitting element is cut off. Therefore, the ends of the magnetic tape can be detected by such an arrangement.

The above-mentioned prior art tape cassette structure has the drawback that when the cassette uses a metal tape (particularly of the binderless metal type), and such a cassette is stored for a long time, dust, powdery dust, corrosive gases contained in the air and so on enter into the cassette through the light receiving window apertures in both sides of the cassette and through the projector insertion holes. This dust, etc. contacts the magnetic tape surface and particularly corrodes the evaporated film side of the tape, causing rust thereon.

Of course, in this conventional tape cassette, an opening/closing lid is provided. When the cassette is stored for a long period of time, the lid is closed to prevent dust from accumulating on the tape, and also to cover the light receiving window holes provided on both side walls of the cassette. However, it has been found that this cassette structure still does not completely prevent rust from forming on the tape.

Accordingly, the present invention provides a tape cassette that is improved in its air-tightness in order that powdery dust, dirt and corrosive gases contained in the air can be prevented from entering the cassette, thus solving the problems of rust, dropout, and clogging of magnetic heads.

In an exemplary embodiment of this invention, there is provided a tape cassette having a projector insertion hole provided in a bottom portion of a cassette. The insertion hole is near the cassette front between a supply reel and a take-up reel enclosed within the cassette. Light receiving window holes are provided in both side walls of the cassette to allow the light from a light emitting element inserted in the projection insertion hole to be passed therethrough. An opening/closing lid is pivotably mounted through arms on the front side of the cassette so that, in a non-use condition, the light receiving window holes are closed by the lid, and ribs or baffles are provided in the vicinity of the light receiving window holes, on both the side walls of the cassette and/or on the inside surfaces of the arms of the opening/closing lid. The ribs or baffles are located so that they baffle or block the light receiving window holes in both the side walls, thus preventing dust from entering the cassette.

According to the tape cassette of this invention, the baffles or ribs are provided near the light receiving window holes to prevent gases or dust from entering the cassette, and improving the air-tightness of the cassette so that the magnetic tape can be prevented from rusting.

SUMMARY OF THE INVENTION

This invention proposes a tape cassette suitable for use in recording and reproducing video and audio signals on an 8-mm video tape recorder or the like, and which has a light projector insertion aperture provided in the bottom of the cassette to be near the cassette front between the supply and take-up reels enclosed within the cassette. Light receiving and passing window apertures are provided in both side walls of the cassette to allow the light from the light emitting element inserted in the projector insertion aperture to pass therethrough. An opening/closing lid is mounted through integral arms over the front side of the cassette so that in a non-use condition, the light receiving window holes are closed by the arms of the lid. Ribs or baffles are provided in the vicinity of the light receiving window holes. The ribs or baffles are either on both side walls of the cassette, and/or on the insides of the arms of the opening/closing lid near such aperture positions as to block the light receiving window holes in both the side walls, thus preventing dust and gases from entering the cassette so as to thereby protect the magnetic tape in the cassette from rusting.

An embodiment of this invention, or a tape cassette from 8-mm video tape recorder according to this invention will be described with reference to FIGS. 1 to 5.

BRIEF DESCRIPTION OF THE DRAWINGS

FIG. 2 is a plan view broken away, of a cassette of the invention.

FIG. 3 is an end elevation of the cassette shown in FIG. 2.

Referring to the figures, there is shown a cassette 1 that is formed of an upper half 3a and a lower half 3b both made of a synthetic resin material, these upper halves 3a and 3b being combined by mutual engagement into a unitary body. Within the cassette 1 the rotatably provided a pair of supply reel 2a and a take-up reel 2b. The reels 2a and 2b have flanges 13a and 13b formed on the lower side on which a magnetic tape 14 is wound. One end of a leader tape is fixed to the supply reel 2a and the other end of this leader tape is joined to the start end of the magnetic 14. Similarly, one end of a trailer tape is fixed to the take-up reel 2b and the other end of the trailer tape is joined to the last end of the magnetic tape 14. These leader tape and trailer tape portions are transparent. The leader tape length is so selected that when all the magnetic tape 14 is completely sound on the tape-up reel 2b, the leader tape will face to, or extend across, a light receiving window hole 8a formed in a side wall 7a as shown in FIG. 2. Similarly, the trailer tape length is so selected that when all the magnetic tape 14 is completely selected that when all the magnetic tape 14 is completely wound on the supply reel 2a, the trailer tape will face to or extend across a light receiving window hole 8b formed in a side wall 7b as shown in FIG. 2. An opening 4 as shown in FIG. 2 is formed on the front of the lower half 3b and the upper half 3a not shown, and across this opening 4 the magnetic tape 14 is extended between the supply reel 2a and the take-up reel 2b as indicated by a one-dot chain line. In the bottom portion 5 of the lower half 3b are formed reel holes 11a and 11b into which the reel drive shafts are to be inserted to drive the supply and take-up reels 2a and 2b. Also formed in the bottom portion 5 are a light projector insertion hole 6 in which a light emitting element is inserted, and an operation hole 15 in which a reel lock means is inserted from the outside. Of these holes, the operation hole 15 is substantially completely closed by the reel lock means, and the reel holes 11a and 11b are respectively closed by the supply reel 2a and the take-up reel 2b when the tape cassette is not being used. The projector insertion hole 6 receives the light emitting element only during recording and reproducing. Thus, when the tape cassette is not used and is stored, dust may enter the tape cassette through the projector insertion hole 6. When the upper half 3a and the lower half 3b are mutually engaged into a set, the portion of the tape cassette in which the magnetic tape 14 is wound on the reels 2a, 2b is substantially closed, except for the above-mentioned projector insertion hole 6, the light receiving window holes 8a, 8b and the opening 4 across which the magnetic tape is extended. The magnetic tape extended across the opening 4 is exposed upon recording and reproducing as shown in FIG. 2. However, when the tape cassette is not used and is stored, the magnetic tape is covered by the opening/closing lid 9 and the sub-lid provided on the back side of the lid 9, and the opening 4 is substantially completely closed as shown in FIG. 4. The opening/closing lid 9 and the sub-lid provided on the back side of the lid 9, and the opening is substantially completely closed as shown in FIG. 4. The opening/closing lid 9 is provided with projections 18. The projections 18 act as pivots and extend inward from left and right arms 16a, 16b of the opening/closing lid 9. The projections 18 are rotatably engaged in the bearings 12a, 12b which are formed in the front portions of the side walls 7a, 7b (see FIGS. 3 and 5) of the upper and lower halves 3a, 3b. Moreover, opening and closing lid light receiving window holes 17a, 17b of, for example, a rectangular shape are formed in the arms 16a, 16b at such positions that when the opening/closing lid 9 is rotated up about the projections 18 as pivots in the arrow-A direction in FIG. 4, they come to be aligned with the light receiving window holes 12a, 12b formed in the side walls 7a, 7b thereby allowing the light from the light emitting element to be led to the outside. When the tape cassette is not used and is stored, the arms 16a, 16b cover the light receiving window holes 8a, 8b formed int he side walls 7a, 7b. FIG. 5 partially shows the side wall 7a of the cassette 1 and the opening/closing lid 9 to be pivotally mounted on the wall 7a. That is, the light receiving window holes 8a, 8b formed in the side walls 7a, 7b are not aligned with the opening/closing lid light receiving window holes 17a, 17b when the opening/closing lid light receiving window holes 17a, 17b when the opening/closing lid 9 is closed. In other words, inverted U-shaped recesses 21 formed in the lower edges of the side walls of the upper half 3a are combined with parts of the upper edges of the side walls of the lower half 3b to form the bearing holes 12a, 12b. Similarly, inverted L-shaped stair portions formed on the lower edges of the side walls of the upper half near the inverted U-letter shaped recesses 21 are combined with substantially C-letter shaped grooves 23 formed on the upper edges of the side walls 7a, 7b of the lower half 3b to form the light receiving window holes 8a, 8b. Under this structure similar to the conventional cassette, dust and corrosive gases would enter into the cassette 1 through the window holes 8a, 8b and fall on the magnetic surface of metal tape, causing rust thereon. It has been found that dust and gases entered through the gaps between the arm 16a of the opening/closing lid 9 and the side walls 7a, 7b as indicated by the arrows-D and -E in FIG. 5. Thus, in this embodiment, ribs 201, 202 are provided on the inner sides of the arms 16a, 16b of the opening/closing lid 9 as shown in FIG. 5, closing the gaps between the cassette 1 and the arms 16a, 16b of the opening/closing lid 9 to cut off air entering in the arrow-D and E direction. In this case, the ribs 201, 202 can be provided at such positions 8a', 8b', of the light receiving window holes indicated by broken line on the arm 16a. These ribs can thus prevent dust from entering in the arrow-D, E direction.

FIG. 1 shows another embodiment of this invention wherein ribs 203 are provided on the side walls 7a, 7b of the cassette. In this case, the ribs 203 are provided only in the vertical direction on the side walls 7a, 7b but ribs 204 are not provided at positions indicated by the broken line. The reason for this is that stop projections for locking the lid, although not shown, are provided on the inner side of the fore end of the arm 16a of the opening/closing lid 9 and would touch the rib when the lid 9 is opened. Such rib 204 can be replaced by the rib 202 (see FIG. 5) provided on the inner side of the arm 16a of the lid 9. Therefore, it is possible to provide vertical ribs on the side walls 7a, 7b and lateral ribs 202 on the inner sides of the arms 16a, 16b of the lid 9 and thereby to shut off the air entering in the direction of arrows D and E.

Figure 1:
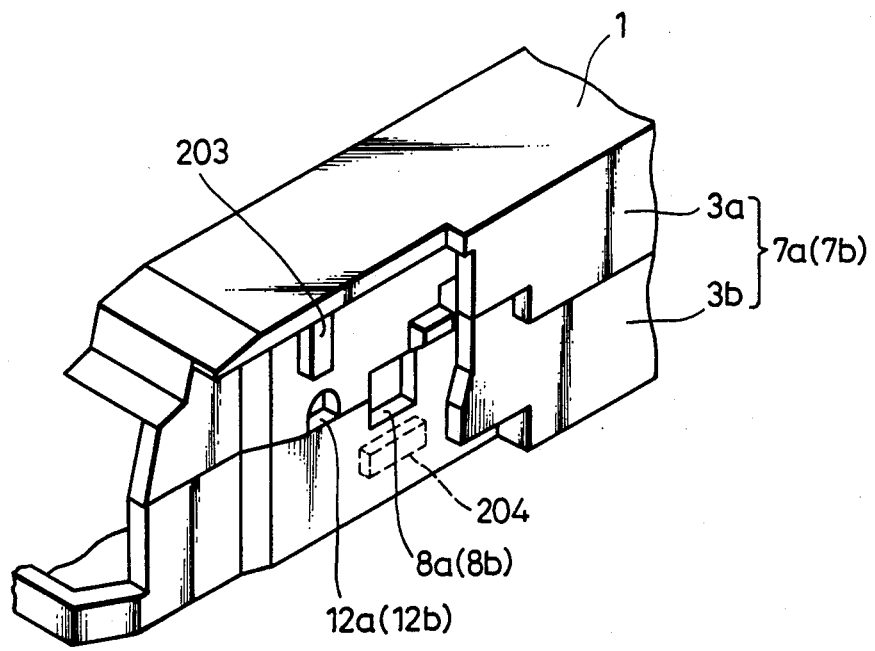
FIG. 1 is a partial isometric view of an embodiment of the invention.
Figure 4:
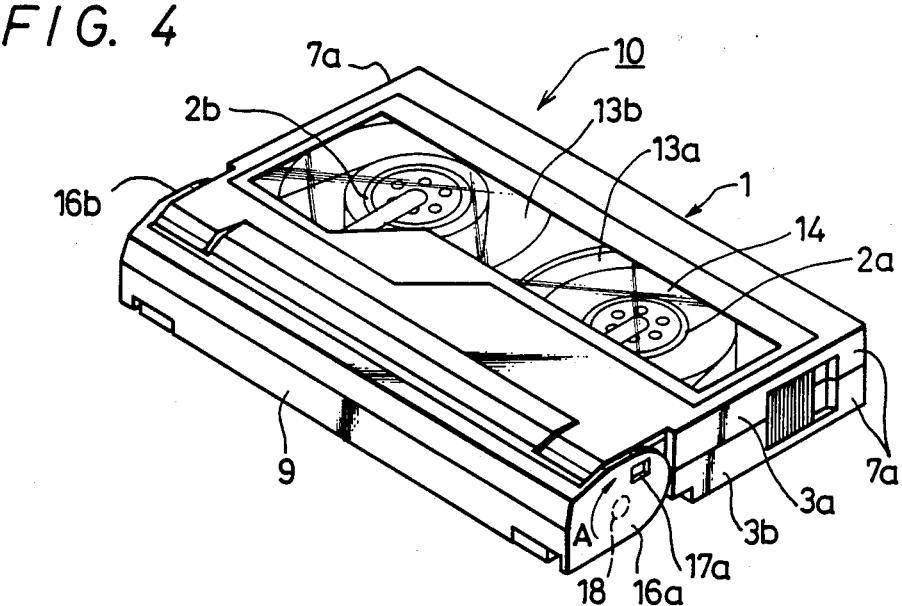
FIG. 4 is an isometric view of a prior art cassette.
Figure 5:
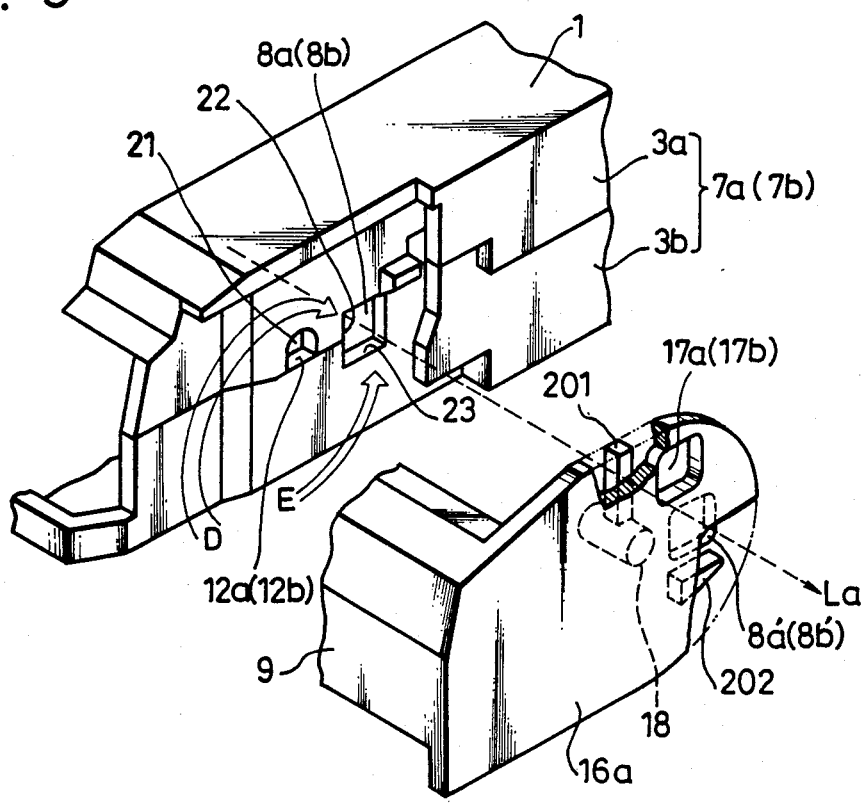
FIG. 5 is an enlarged, partial exploded view of a cassette body and a lid having an embodiment of the present invention thereon.

Furthermore, if lateral ribs 204 were located on the side walls 7a, 7b the windows 17a, 17b provided on the inner side of the fore end of the arm 16a of the opening/closing lid 9 would touch the rib when the lid 9 was opened. Such rib 204 can be replaced by a rib 202 (see FIG. 5) provided on the inner side of the arm 16a of the lid 9. Therefore, it is possible to provide vertical ribs on the side walls 7a, 7b and lateral ribs 202 on the inner sides of the arms 16a, 16b of the lid 9 and thereby to shut off the air entering in the direction of arrows D and E.

Since windows 26a, 26b (see FIG. 2) for allowing light to pass are provided at the projector insertion hole 6, the windows 26a, 26b must be closed with a transparent material for preventing ambient dust and gases from entering therethrough.

The tape cassette 10 constructed as shown and a conventional cassette without ribs near the light receiving window holes were tested to determine how much rust formed on the magnetic tape after a heat cycle test and long-term storage. The result was that the tape cassette of the inventive embodiments showed no rust near the light receiving window holes, whereas the tape in the conventional cassette with no ribs showed rust. It can thus be seen that a cassette constructed according to the above-described embodiment prevents the generation of rust by providing the described ribs or baffles near the light receiving window holes. Consequently, no dropout is caused and the magnetic heads are not clogged while the magnetic tape is being passed around the drum. This invention is not limited to the above embodiments, but is subject to various different modifications without departing from the gist of this invention.

According to the tape cassette of this invention, the air-tightness of the cassette in which a magnetic tape is placed can be enhanced by providing ribs or baffles near the light receiving window holes, with the result that dust and gases can be prevented from entering the cassette and that the magnetic tape can be prevented from rusting on its surface.

I claim as my invention:

1. A tape cassette having a projector insertion recess provided in the bottom of the cassette adjacent the cassette front between supply and take-up reels enclosed within the cassette, light receiving window apertures provided in both side walls of the cassette to allow the light from a light emitting element inserted in the projector insertion recess to be passed laterally therethrough, and a lid pivotally mounted on the front side of the cassette via arms pivoted on the side walls, so that in a stored condition, the light receiving window apertures are closed by the arms of the lid, characterized in that baffles, each of which is in the shaped of a long projection and is disposed in a respective different direction between the side wall of the cassette and the arm of the lid, are provided adjacent the light receiving window apertures provided in both the side walls of the cassette to impede air flow in different directions from outside the cassette into the cassette via the apertures, thus preventing dust from entering the cassette.

2. The structure of claim 1 wherein at least some of the baffles are fixedly carried by the side walls.

3. The structure of claim 1 wherein at least some of the baffles are fixedly carried by the arms.

4. The structure of claim 1 wherein the baffles comprise cooperating baffle members mounted respectively on the arms and side walls.

5. A tape cassette having a projector insertion recess provided in the bottom of the cassette adjacent the cassette front between supply and take-up reels enclosed within the cassette, light receiving window apertures provided in both side walls of the cassette to allow the light from a light emitting element inserted in the projector insertion recess to be passed laterally therethrough, and a lid pivotally mounted on the front side of the cassette via arms pivoted on the side walls, so that in a stored condition, the light receiving window apertures are closed by the arms of the lid, characterized in that baffles are provided adjacent the light receiving window apertures in both the side walls of the cassette to impede air flow from outside the cassette into the cassette via the apertures and at least some of the baffles are fixedly carried by the arms, thus preventing dust from entering the cassette.

6. A tape cassette having a projector insertion recess provided in the bottom of the cassette adjacent the cassette front between supply and take-up reels enclosed within the cassette, light receiving window apertures provided in both side walls of the cassette to allow the light from a light emitting element inserted in the projector insertion recess to be passed laterally therethrough, and a lid pivotally mounted on the front side of the cassette via arms pivoted on the side walls, so that in a stored condition, the light receiving window apertures are closed by the arms of the lid, characterized in that baffles are provided adjacent the light receiving window apertures provided in both the side walls of the cassette to impede air flow from outside the cassette into the cassette via the apertures and the baffles are mounted respectively on the arms of the lid and side walls of the cassette.

* * * * *